Jan. 1, 1935.   O. U. ZERK   1,985,908
WHEEL COVER AND SECURING MEANS THEREFOR
Filed Oct. 3, 1931   3 Sheets-Sheet 1

INVENTOR.
Oscar U. Zerk
BY
Slough and Canfield
ATTORNEY.

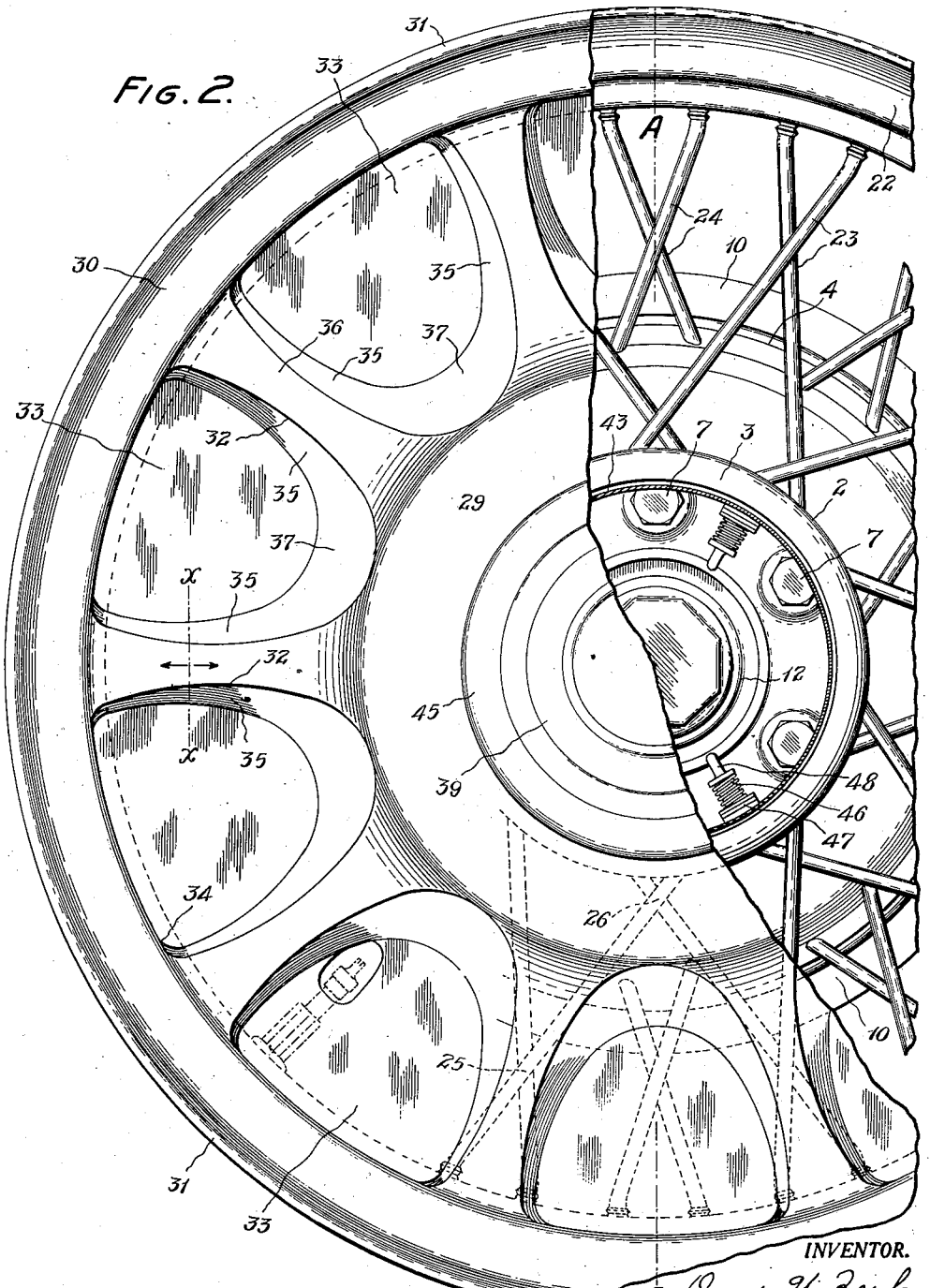

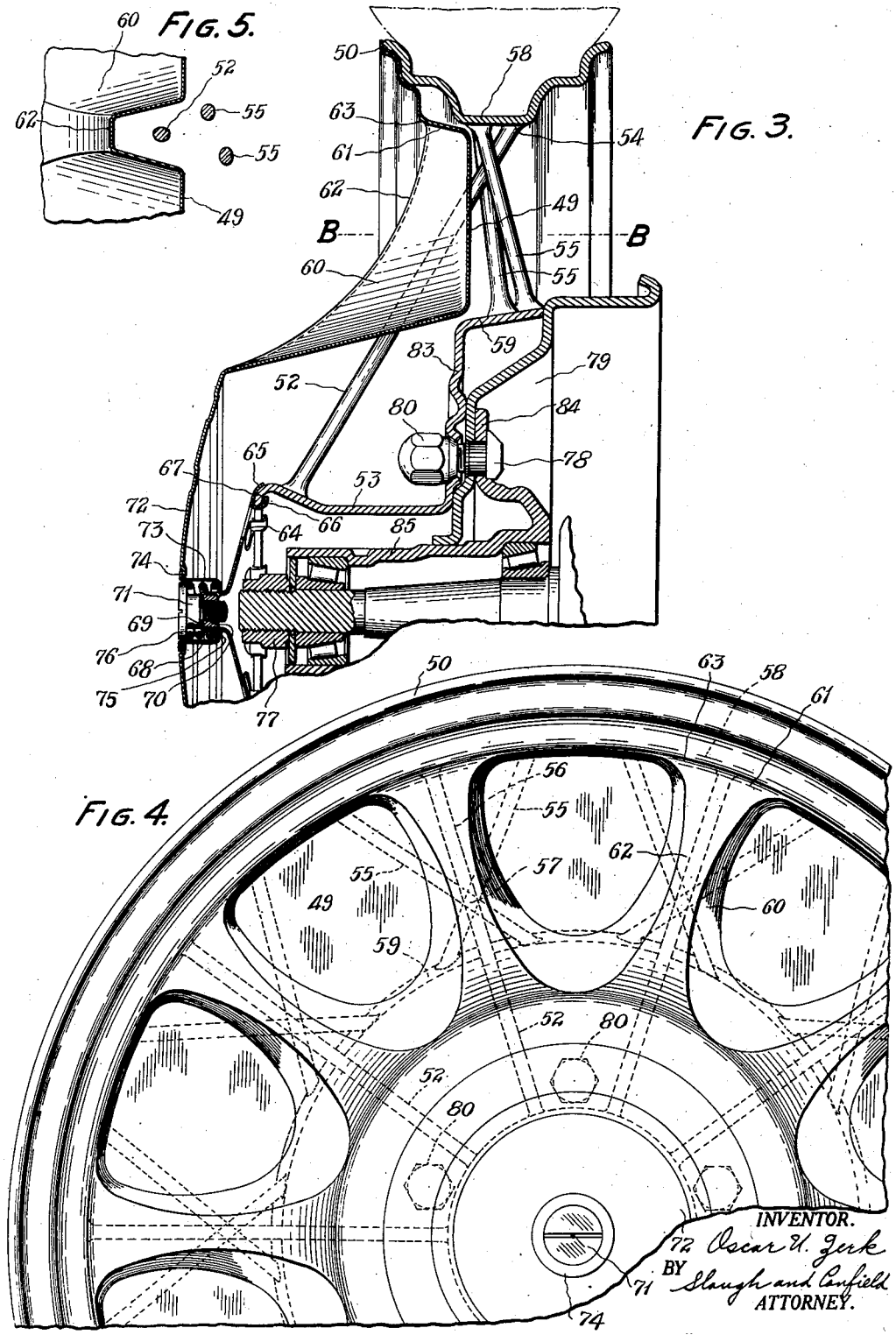

Patented Jan. 1, 1935

1,985,908

UNITED STATES PATENT OFFICE 1,985,908

WHEEL COVER AND SECURING MEANS THEREFOR

Oscar U. Zerk, Cleveland, Ohio

Application October 3, 1931, Serial No. 566,616

4 Claims. (Cl. 301—37)

My invention relates to wheel covers and securing means therefor. In my co-pending applications, Serial Nos. 540,306, 540,308, and 540,309, all filed May 27, 1931, I have disclosed a series of wheel covers applicable to the artillery type of wheels, and in my co-pending application Serial No. 540,307, filed May 27, 1931, I have disclosed a wheel cover applicable to the disk type of wheels, the latter giving the disk wheels the appearance of artillery type wheels.

Many, if not most of the automobiles now in use are equipped with wire type wheels. The wire spokes of such wheels are very difficult to keep clean, and therefore become unsightly in appearance, and the present tendency is towards obsoletion of such wheels for this reason. The present invention, therefore, relates to the provision of an improved, readily detachable, wheel cover preferably presenting, from the exterior of the vehicle, the appearance of a more up-to-date sheet metal spoked wheel, and which cover will effectively conceal from view the more unsightly wire spokes of the actual wheel.

Some of the wire wheels now commonly in use are provided with two main rows of spokes, whereof the spokes of the outermost row are longer and the spokes of the inner row are shorter. The outer spokes are commonly disposed in pairs, each of the spokes of a pair being arranged so as to cross the other. In another type of wheel, commonly used, one outwardly situated and radially extending spoke is used in place of the crossed pair of the former type. In both types of wheels, a substantial spacing is had between each pair, or single outer spokes, as the case may be.

It is an object of my invention therefore to provide an improved cover for the wire spoked types of wire wheels which may readily be removably affixed to the outer faces of such wheels to conceal the wire spoked structure thereof and to present the external appearance of a highly finished artillery wheel, preferably of the sheet metal type.

Another object is to provide an improved cover for wire spoke wheels of the type referred to presenting the external appearance of a highly finished artillery wheel and having between adjacent spokes of the artillery wheel depressed portions of color contrasting with the color of the spokes.

Another object of my invention is to provide improved resilient means for maintaining a cover as aforesaid in proper operative position relative to the wheel.

Other objects of my invention and the invention itself will be readily apparent from the following description of certain embodiments of my invention, illustrated in the accompanying drawings.

In the drawings:

Fig. 2 is a front elevational view of the wheel and cover of Fig. 1, the view of Fig. 1 being taken on the line AA of Fig. 2. In Fig. 2, which is fragmentary, a fragment of cover is shown as broken away to expose the interiorly disposed wheel parts;

Fig. 3 is a fragment of a diametrical transverse sectional view of a wheel and an improved cover therefor which is a variant embodiment of my invention, being applied to a wheel of the type wherein the front row of spokes are disposed radially of the wheel and are arranged singly to form a spoke set in combination with a pair of crossed spokes of the rear row;

Fig. 4 is a fragment of a front elevational view of the cover of the embodiment of Fig. 3 as applied to a wheel of the type shown in Fig. 3, the hidden wire spokes thereof being indicated by dotted lines;

Fig. 5 is a fragmentary view of a transverse section taken through a spoke set comprising a single spoke of the front row and a pair of crossed spokes of the rear row, in combination with the portions of the cover, adjacent to said spoke set and substantially embracing the front spokes thereof and substantially overlying said spoke set; the section is taken on the line B—B of Fig. 3.

Figure 1:
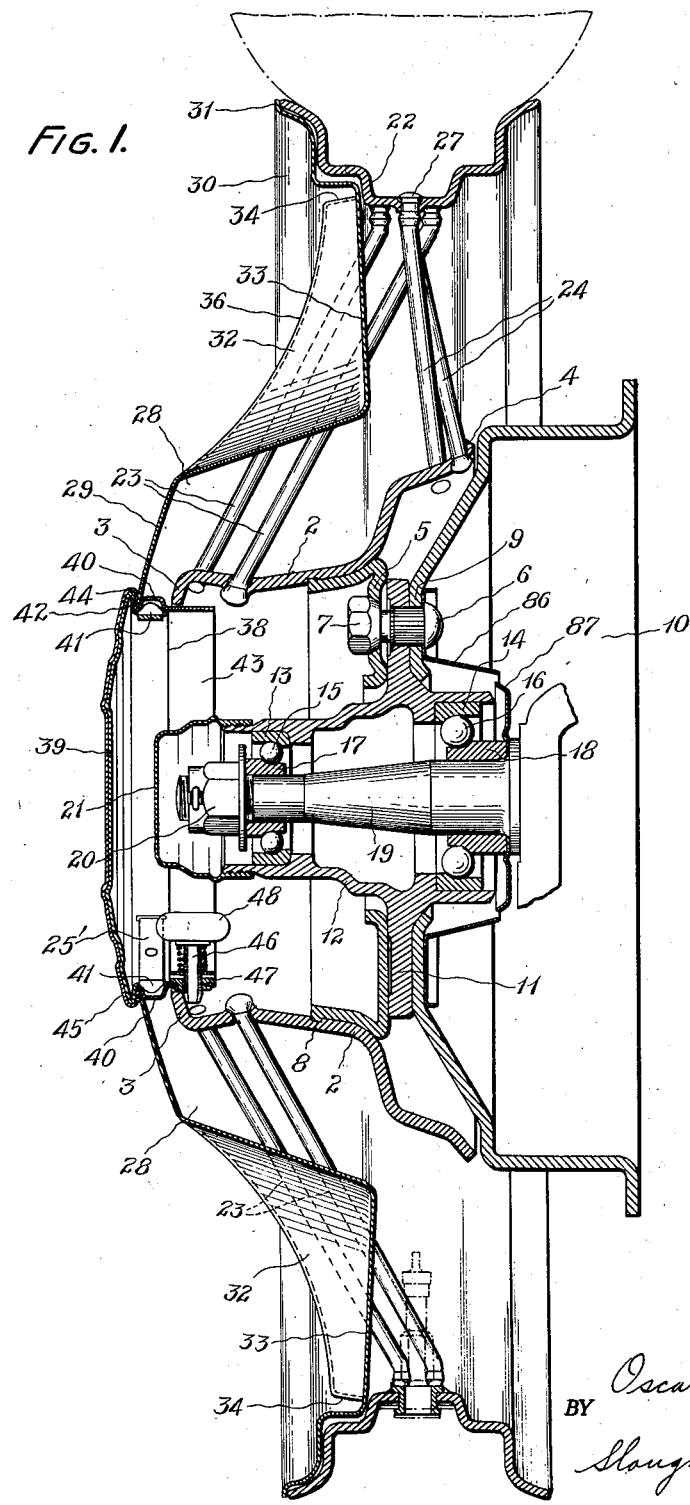
Fig. 1 is a transverse medial section through a wire spoked type of wheel showing my improved cover applied thereto, said wheel being of the type having its spokes arranged in front and rear rows, those of both rows being in turn arranged in pairs of crossed spokes.

The different embodiments of my invention illustrated in the drawings, comprise an integral cover with a hub cap detachably mounted centrally thereon, said cover preferably formed, as shown in the drawings, to form a superficial facing having the appearance of an artillery type of sheet metal wheel, for an actual wheel having wire spokes.

In the embodiment of my invention illustrated in Figs. 1 and 2 of the drawings, the wheel with which my improved cover is illustrated as applied thereto comprises a tubular outer hub 2 having an inwardly turned front flange 3. The outer hub has an inner flange 5 provided with a plurality of annularly interspersed apertures through which mounting bolts 6 carrying removable forwardly disposed clamping nuts 7, project to attach the outer hub to a flange 11 of an inner hub 12.

Wire wheel spokes 23 and 24 are provided to interconnect the outer wheel hub 2, with a wheel rim 22, these spokes having their inner ends so arranged as to comprise a row of front spokes 23 and rear spokes 24.

The spokes are crossed in front and rear pairs, and the pairs are disposed alternately around the wheel, so that viewing the wheel from the front, the crossed rear spokes such as 24, Fig. 2, are followed by the crossed front spokes 23 and then by the crossed rear spokes 24 again, and so on. This manner of alternately disposing front and rear pairs of spokes provides towards the front side of wheels of this type a considerable space intermediate the crossed front pairs of spokes 23, and I utilize this fortuitous circumstance in the forming of my improved wheel cover hereinafter described.

For wheels of the above described type, I have provided an improved cover 28 formed with a centrally disposed concavo-convex annular hub portion 29, on outwardly flaring rim cover portion 30 having a short upstanding rim-engaging flange 31 and being curvilinearly stepped between said flange and the intermediate portion of the cover which in turn comprises alternately disposed substantially channel-shaped ribs 32 and intervening inwardly depressed substantially planular areas 33. The areas 33 are disposed approximately in the same radial plane and the ribs 32 are disposed intermediate said areas and serve to separate them.

The ribs 32 are preferably substantially concavely curved and extend inwardly from the said annular sheet metal hub portion 29 to nearly the rim covering portion 30 of the cover, being inclined sharply inwardly as shown at 34 to join with the rim covering portion of the cover adjacent the base of said rim.

The channeled ribs 32 have flaring side walls 35 which extend from the outermost end wall 36 of the ribs inwardly to merge with the preferably substantially flat depressed areas 33. The ribs so formed, particularly when finished to a color strongly contrasting with the areas 33, have the appearance of spokes and the entire cover the appearance of a wheel of a very well appearing artillery type which may be formed from sheet metal.

As best appears in Fig. 2, as a further element of improvement, I join the flaring sides of each adjacent pair of ribs 32 by a flaring arcuately formed sheet metal portion 37 and progressively increase the width of each of the imitation spokes formed by the ribs 32 in both directions to form a portion such as XX, Fig. 2, which is of least width, as indicated by the arrows.

The imitation spokes so formed recede rather abruptly by their concavely curvilinear outer surfaces, from the oppositely convexly curved annular hub portion 29, and when viewed from the front side of the wheel, the cover facing therefor exhibits the appearance of an entirely different type of wheel from that concealed thereby, the said type having an appearance of ruggedness and strength which is substantially absent from the concealed wire spoked wheel and presents an outer surface which is very readily cleaned and polished in contradistinction to the concealed surfaces of the spokes whose appearance is now of little moment.

The central portion of the hub is held in place in a manner to be described so as to exert inwardly directed pressure thereagainst to maintain the pressure contact of the cover with the edge of the rim by the flange 31, by means including the flange 3 of the wheel.

The preferred arrangement for securing the wheel cover in place is to provide an inwardly extending sleeve 38, the outer end of which is reversely turned as shown at 42 to enfold the inner border of the annular hub portion 29 of the cover, whereby the sleeve 38 is permanently supported on said cover hub portion, in such a way that a tubular portion 43 of the sleeve will telescope into the inturned end flange 3 of the wheel.

Removable securing means in the form of screws 46 are interspersed at intervals around the tubular portion 43 being screw-threaded through eyelets 47 which in turn are riveted onto said flange, said eyelets extending through apertures of said tubular portion. The ends of the screws 46 extend outwardly, preferably in a radial direction, and have their sides tapered for engagement with the inner correspondingly tapered surface of the outer hub flange 3.

By turning the enlarged heads 48 of the screws 46, these may be made to engage wedgingly with the hub flange 3 and to draw the sleeve 38 inwardly to exert inwardly directed pressure on the inner border portion of the cover hub portion 29. This pressure in turn is resiliently communicated by sheet metal cover portions of the cover to the peripheral flange thereof for the purpose previously related.

I preferably provide at least three of the securing screws 46 equally interspaced around the sleeve 38 and I preferably locate them intermediate of longitudinal projections of the bolts 6, whereby a workman may reach the nuts 7 of said bolts without engaging any parts of the screws 46.

A hub cap 39 is removably secured in position to cover the central aperture of the cover hub portion 29 in a known manner by spring pressed detents 41 on the cap engageable with an annular depression 40 in the sleeve 38. The cap is provided with an outwardly extending bead edge 44 to cover the portion 42 of the tube 38 and to give the cap a finished rounded edge of the cap is also provided with an outer sheet metal facing 45 of suitable concavo-convex disc form to snugly fit over the cap and to be secured thereto by its enfolding edges.

In Figs. 3 to 5 inclusive, I illustrate a variant embodiment of my invention comprising my improved wheel cover suitably formed to provide a facing for a wheel having wire spokes which are arranged as in the modern Ford type of automobile.

In such wheels there are front single spokes 52 and relatively crossed pairs of spokes 55 disposed rearwardly thereof. In the embodiment of my invention shown in Figs. 3 to 5 inclusive, due to the somewhat different spoke arrangement from the wheel shown for the first described embodiment, the channeled imitation spokes 60 are each adapted to primarily embrace a front longer spoke 52 and to overlie the portions of the rear spokes 55.

As in the foregoing embodiment, between the so-called forward spokes 52 and forwardly of the so-called rear spokes 55, I position the substantially planular flattened intermediate portions 49 of the cover. The forward surfaces of these planular portions 49 are preferably given a very dark black or blue finish, whereas the intervening imitation spoke portions 60 are preferably given a bright luster such as by the application of a film of chromium plating thereto.

In this form no removable cap is provided.

The central portion 72 of the cover, formed to resemble a much enlarged wheel hub cap, is provided with a centrally disposed inwardly positioned tube extension 73 which may be pressed from the same sheet of metal as the cover portion 72, or may be a separate piece with its outermost outwardly turned radial flange 74 welded, soldered or otherwise preferably rigidly secured, preferably to the outer surface of the inner border portion of the said cover. The inner end of the tube 73 is provided with an inturned annular flange 75 and a helical spring 76 is preferably positioned between the head of a screw 71 and the tube flange 75 being telescoped over the stem of the screw 71 and over a tubular extension 68 of a securing disc 64 to be described.

Turning the screw 71 inwardly will effect a compression of the spring 76 to communicate inwardly directed resiliently maintained pressure on the central portion 72 of the cover, which pressure in turn is transmitted to its peripheral portion 50 to effect cover positioning pressure between the interfitted flange 50 of the cover and the outer peripheral edge of the wheel tire rim 58.

The pressure creating removable securing means for the cover comprises a sheet metal disc 64, whose peripheral portion comprises outer and inner tongues 65 and 66 bent toward each other to securely embrace the two sides of the inturned end flanges 67 of the said outer wheel hub 53. The disc 64 is preferably of concavo-convex form, bulging outwardly and terminating centrally in a tubular extension 68 open at its end 69. A nut 70 is non-rotatably mounted in the extension 68 and receives the centrally disposed cover retaining screw 71 whose stem is projected through the open end 69 of said extension and said nut, being screw-threaded through the nut.

Removal of the screw 71 will permit removal of the entire cover and access to the axle nut 77 may be had by removing the disc 64 by bending the tongue 66 inwardly by a screw driver or like tool. To permit this, the material of the disc 64 is preferably thin and relatively pliable, and suitable tool admitting perforations may be provided in the disc adjacent the tongues.

The screw 71 and the relatively telescoped tubular extensions 73 and 68 of the cover and of the wheel hub preferably in combination with the interposed relatively telescoped helical spring 76 form a single axially disposed securing means for the cover which is independent of the rotatable wheel axle, or central stub axle as the case may be depending upon whether or not the axle is a driving axle.

The above described securing means is particularly convenient where the cover is being applied to wheels for the first time, in which case it is only necessary to substitute the disc 69 for the cap not shown but ordinarily in use on the flange 67 and then apply the cover with the tube 73 affixed thereto; then place the spring 67 within the tube 73 and lastly apply the cover screw 71.

With wheels of the type shown in Figs. 1 and 2, the wheel attaching bolts 7 for the wheel are inside of the outer wheel tubular hub 2, whereby when the cover cap is removed, the operator may apply socket wrenches to the bolts 7. The cover and wheel therefore may be removed as a unit or the cover alone may be removed. With wheels of the type shown in Figs. 3 to 5, the wheel attaching bolts 80 are outside of the outer wheel hub 53 and are rendered accessible upon removal of the entire cover.

Having thus described my invention in certain embodiments and in variant forms, I am aware that numerous and extensive departures may be made from the said embodiments and forms, but without departing from the spirit of my invention, and I therefore claim as my invention:—

1. The combination with a wheel of the wire spoked type having a nave and tire supporting rim and front and rear sets of spokes interconnecting said nave and rim, in which the radially inner ends of the front set of spokes are secured to the wheel nave forwardly of corresponding ends of the rear set of spokes, of a protective sheet metal wheel cover affixed to the front face of the wheel and comprising relatively concentric wheel nave covering and wheel rim covering portions and an intermediate portion interconnecting said nave and rim cover portions, said intermediate portion comprising rearwardly spaced rearwardly channeled spoke simulating portions extending radially between said nave and rim covering portions, each channeled portion overlying and embracing different of the spokes of the front set, and also comprising depressed portions each disposed between and interconnecting the adjacent walls of adjacent of said channeled portions and interconnecting said nave and wheel rim portions, the said depressed portions being nested between adjacent of said front spokes and positioned adjacent the rear spokes.

2. A protective sheet metal cover for vehicle wheels of the conventional wire spoked type having front and rear sets of wire type spokes extending between and interconnecting a wheel nave and a wheel rim, said nave having a rearwardly disposed portion of substantially increased diameter, the front set of spokes being longer than the rear set and being joined to the nave at a relatively forward reduced portion thereof and the rear shorter set of spokes joining with the nave rearwardly of the front set at a nave portion of increased diameter, said cover comprising a generally cup-shaped wheel nave masking portion covering at least a part of said wheel nave and the radially inner ends of the front spokes, and rearwardly opened channeled spoke simulating portions extending radially outwardly of said nave covering portion, each of said channeled portions overlying and embracing the radially outer other portions of the spokes of the front set, relatively depressed portions disposed between the rearwardly disposed edges of adjacent of the channeled portions and interconnecting said channeled portions and said nave covering and rim covering portions, said depressed portions together with bounding side walls of said channeled portions and portions of said nave covering and rim covering portions defining cups nested between the spokes of the front set and said rim and nave covering portions, said depressed portions forming end walls for said cups and disposed adjacent the spokes of the rear set.

3. The combination with a wheel of the wire spoked type having a nave, a tire supporting rim, and front and rear sets of spokes interconnecting said nave and rim in which the radially inner ends of the front set of spokes are secured to the wheel nave more forwardly and more radially inwardly than the rear set of spokes, of a protective sheet metal cover affixed to the front face of the wheel comprising a wheel nave simulating portion, a series of spoke simulating channels extending radially therefrom, said channels opened rearwardly and each overlying and embracing different of the spokes of the front set, and a series of relatively depressed portions, each extending between adjacent walls of adjacent channels and interconnecting them, said depressed portions and portions of said channel walls nested within the spaces provided between said embraced wheel spokes of the front set and adjacent wheel spokes of the rear set of wheel spokes.

4. The combination with a wheel of the wire spoke type having a nave, a tire supporting rim, front and rear sets of spokes inter-connecting said nave and rim, of a protective sheet metal cover affixed to the front face of the wheel comprising a wheel nave simulating portion, wheel spoke simulating channels extending radially therefrom, said channels opened rearwardly and each overlying and embracing different of the spokes of the front set, and adjacent walls of adjacent channels interconnected by portions initiating substantially at the axially outer nave simulating portion and terminating axially inwardly of the radial inner ends of the front set of spokes, said cover also being so constructed and arranged as to form a mask for the rear set of spokes, said inter-connecting portions and portions of said channel walls being nested within the spaces provided between adjacent wheel spokes of the front set.

OSCAR U. ZERK.